(12) United States Patent
Reichhart

(10) Patent No.: US 8,319,996 B2
(45) Date of Patent: Nov. 27, 2012

(54) METHOD FOR CONTROLLING THE PRODUCTION OF A PRINT PRODUCT

(75) Inventor: Thomas Reichhart, Aldenhoven (DE)

(73) Assignee: Hewlett-Packard Gesellschaft m.b.H., Vienna (AT)

( * ) Notice: Subject to any disclaimer, the term of this patent is extended or adjusted under 35 U.S.C. 154(b) by 710 days.

(21) Appl. No.: 12/304,203

(22) PCT Filed: Jun. 12, 2007

(86) PCT No.: PCT/EP2007/005169
§ 371 (c)(1),
(2), (4) Date: Dec. 10, 2008

(87) PCT Pub. No.: WO2007/144138
PCT Pub. Date: Dec. 21, 2007

(65) Prior Publication Data
US 2009/0185216 A1    Jul. 23, 2009

(30) Foreign Application Priority Data

Jun. 13, 2006    (DE) .................. 10 2006 027 626

(51) Int. Cl.
*G06F 3/12*    (2006.01)
*G06K 15/00*    (2006.01)
*H04N 1/60*    (2006.01)
*G06K 15/02*    (2006.01)

(52) U.S. Cl. ..................... 358/1.15; 358/1.11; 358/1.13; 358/1.18; 358/1.9

(58) Field of Classification Search ........ 358/1.11–1.18, 358/1.2; 706/46; 705/1; 715/500
See application file for complete search history.

(56) References Cited

U.S. PATENT DOCUMENTS

| | | | |
|---|---|---|---|
| 6,441,920 B1 * | 8/2002 | Smith | 358/1.2 |
| 7,345,789 B2 * | 3/2008 | Miyamoto | 358/3.06 |
| 7,701,605 B2 * | 4/2010 | Miyata | 358/1.15 |
| 2004/0186742 A1 * | 9/2004 | Tuijn et al. | 705/1 |
| 2004/0187073 A1 * | 9/2004 | Tuijn et al. | 715/500 |
| 2004/0208500 A1 * | 10/2004 | Kiyosu et al. | 396/549 |
| 2005/0030577 A1 * | 2/2005 | Wiechers | 358/1.15 |
| 2005/1030577 | 2/2005 | Wiechers | |
| 2005/0050466 A1 * | 3/2005 | Sangroniz et al. | 715/526 |
| 2005/1050466 | 3/2005 | Sangroniz | |
| 2005/0213144 A1 * | 9/2005 | Uejo | 358/1.15 |
| 2005/0256818 A1 * | 11/2005 | Sun et al. | 706/46 |
| 2006/0170970 A1 * | 8/2006 | Tuijn et al. | 358/1.18 |

FOREIGN PATENT DOCUMENTS

| | | |
|---|---|---|
| DE | 101 22 880 A1 | 11/2001 |
| DE | 102 12 890 A1 | 10/2003 |
| EP | 1 531 610 A | 5/2005 |

* cited by examiner

*Primary Examiner* — Satwant Singh

(57) ABSTRACT

The invention discloses a method for controlling the production of printed matter using a Management Information System (MIS), where first of all the MIS uses a request formulated by a customer to create an offer for producing the printed matter and transmits MIS order data to a print input stage system, and the print input stage system then uses an order formulated by the customer to create print input stage order data for at least one system which produces the printed matter. To simplify the handling of discrepancies between the order and the offer, it is proposed that the print input stage system transmit the print input stage order data to the MIS and that the MIS use the print input stage order data to control production of the printed matter.

20 Claims, No Drawings

METHOD FOR CONTROLLING THE PRODUCTION OF A PRINT PRODUCT

BACKGROUND OF THE INVENTION

The invention relates to a method for controlling the production of a print product by means of a Management Information System ("MIS"), wherein the MIS initially transmits MIS job data to a prepress system, and thereafter the prepress system creates prepress job data for at least one execution system operating in the production of the print product.

In graphic production, thus in the production of various types of print products rationalization potentials are exploited through increased networking of all sectors, in particular sales, job costing and order processing, production planning and control, in actual production in prepress, press and post press and shipping, in the cross sectional areas of materials and warehouse management, financial and payroll accounting, controlling, cost accounting and quality assurance, down to managing customer and vendor contact information. The productivity improvement, which can be achieved through networking, is substantially influenced by the quality of the interfaces for exchanging data between various associated systems.

The Job Definition Format "JDF" and the Job Messaging Format "JMF", as a subgroup of JDF, are generally known formats, which were developed and are maintained for data exchange by the consortium "International Cooperation for the Integration of Processes in Prepress, Press and Postpress" ("CIP4-Consortium", www.cip4.org). The CIP4 specification is based on the object to standardize the communication between all systems of the print shop, the designer, the advertising agency, customer of print products and subcontractors of contractors within a networked graphic production for all production variants and potential situations in a flexible manner without restrictions.

JDF, which is based on the "Extensible Markup Language" ("XML"), a well known meta language for defining document types, developed by the "World Wide Web Consortium" ("W3C", www.w3.org), is not only intended according to the intention of the CIP4-consortium to facilitate the system overreaching description of processes and products, but is additionally intended through vertical integration, on the one hand, of the production process, and, on the other hand, of the commercial departments, to facilitate a high level of transparency of all production processes, a standardized documentation of the relevant target and actual data, and an overreaching production control in an understandable and integrated data structure. In particular, a job in JDF shall be described only once in one form, which is understood by all process participants also in external communication with customers as well as with subcontractors and their executing systems in the man-machine and machine-machine communication over language and platform boundaries.

Contrary to the philosophy of the CIP4-consortium and to the concept of JDF based thereon, however, there are significant restrictions in real life operations of networked graphic production, and there are specific differences with respect to the information, which is required, actually used or provided for use by other execution systems by the particular execution systems. The method described supra in this context relates to the communication between a Management Information System ("MIS") as a central controlling and monitoring unit in networked graphic production and a prepress system. A MIS, which implements such a method, is generally known from the applicant under the product designation "HIFLEX" (www.hiflex.de).

In the context of a request for quotation at a graphic production company regarding the production of a print product, a customer initially specifies request data in a generally known manner thus, in particular, format, print-run, paper- and print quality, binding type and latest delivery date for the completed print product. In the context of the known method, the MIS initially automatically determines based on said request data a particular group of possible parameters for producing the print product, e.g. the imposing schemes, the sheet formats and paper types used for the print sheets, down to selecting the execution systems to be actually used, like e.g. prepress-, press-, folding-, cutting-, binding- and packaging systems including the respective use dates and run times, and calculates a possible quote based on the costs incurred in the particular cost chapters.

The known MIS initially substantially automatically determines the essential basics for the accounting for generating a quote for producing a print product according to the customer request based on said job data, possibly after manual specification or change of particular parameters and subsequent recalculation of dependent parameters of the production and of the quote. When the customer accepts the quote, the MIS uses the same job data for controlling the execution systems and transmits said MIS job data, e.g. in JDF format to a well known prepress system, and as start information to the other execution systems for setting up the job.

For example, the MIS determines an imposing scheme in the context of calculating a quote, thus it determines an assembly of pages of the print product to be jointly printed on a print sheet and transmits said assembly to the prepress system after the job has been aborted. The imposing scheme can be transmitted by JDF or, depending on the requirements of the prepress system, in one of the precursor formats of JDF, the binary "Portable Job Ticket Format" ("PJTF") developed by Adobe, or in a proprietary format.

Generally known prepress systems, like e.g. Agfa Delano or Heidelberg Printready, comprise a proprietary interface for communicating with the customer. Through this interface, typically a web interface, the customer transmits the actual page information to the prepress system typically in "Portable Document Format" ("PDF") in order to complete the job data.

Furthermore, the system operator gets the option, generally upon an order by his manager, to revise the job data. In order to still provide the greatest flexibility to the customer after the job has been aborted, the known prepress system provides options among other things to subsequently adapt the print run, the page format, the page number, the paper- and print quality, and the colors and the binding of the print product and suggests, if required, another imposing scheme from a proprietary library of imposing schemes, which is compatible with the revised parameters. By means of the prepress system, the system operator then combines the information of the imposing scheme and of the pages in an interactive process.

Based on this combined information, the prepress system, on the one hand, creates a print sheet layout for the plate setter for producing a printing plate and, on the other hand, creates a job ticket with prepress job data for the subsequent print execution systems. The job ticket, as a digital counterpart to the job folder, thus among other things defines the additional parameters as a collection of information for producing the print sheet, using the exposed printing plate on the print system. Besides PJTF and JDF, the use of "Print Production Format" ("PPF"), based on a development by Heidelberger Druckmaschinen AG, or the use of proprietary formats based on said development, are quite common.

On the subsequent execution systems, like e.g. printing- and binding machines, an automatic setup is not possible anymore, due to the changes relative to the MIS job data. The respective machine operator rather sets up the job, generated according to the MIS data, according to the possibly deviating prepress job data, mostly based on manually inserted supplemental directions, e.g. from the department manager. This activity places high demands on the internal communications in the graphic production shop, and eventually on the machine operator, who has to detect the changes which are relevant for the respective execution system and who has to set up the respective system accordingly. This setup activity is, on the one hand, error prone and thus cost intensive and, on the other hand, frequently leads to unscheduled shutdown times in production by itself.

In the context of the control of the production of a print product according to the known method, the MIS, although, possibly still obtains knowledge of the prepress job data which differ from the MIS job data, in the sense of a report regarding the completion of the tasks of the prepress system, however, the MIS does not interpret said job data, since it does not interfere by itself with the production process in subsequent execution systems. In the MIS, thus status reports of the subsequent execution systems cannot be safely associated, due to the possibility of deviations of the MIS job data from the prepress job data which are the actual basis for the production, in particular, when the number of the print sheets is subsequently increased, said status reports can neither be used in their entirety for monitoring production of a print job, nor for product cost analysis of the print job without manual rework.

It is the object of the invention to facilitate handling deviations between the job and the quote.

SUMMARY OF THE INVENTION

Based on the known method, it is suggested according to the invention that the prepress system transmits the prepress job data to the MIS and that the MIS controls the production of the print product based on the prepress job data.

The job tickets created by the state of the art prepress systems for controlling the subsequent systems, although, are not provided for alignment of the prepress job data included therein with the original MIS job data. However, said job tickets still necessarily include information, from which the deviations, though not directly legible, however, can at least be derived in a safe manner. A job ticket includes e.g. an imposing scheme, from which not only the print sheet format, the page number, the coloring and the final format of the print product, but also through the respective characteristic position of the pages, fold sheets and folding schemes, can be determined. The specified formats of the various job tickets facilitate their automated processing and interpretation in the MIS.

According to the method according to the invention, the job data and the prepress job data actually used for producing the print product are not only provided independent from one another in the MIS, but the prepress job data are rather interpreted, and the parameters generated by said interpretation are integrated into the database of the MIS, when in doubt, interactively. The method according to the invention thus initially transfers the complexity required in the state of the art into the area of job costing and production planning, and thus avoids unplanned downtimes in production.

Furthermore, the consistency of the data in the MIS and in the execution systems is assured according to the method according to the invention. Status reports of the execution systems, which are only archived in a MIS according to the state of the art for documentation purposes, can be safely, and thus in a manner which can be automated, associated with the steps planned in the context of job costing and can be interpreted with respect to their specific information content in an MIS operating according to the method according to the invention. The method according to the invention thus facilitates automated monitoring also for several concurrent complex production processes, down to online diagnosis of unexpected bottlenecks created by delays of particular partial processes, including the development and selection of scenarios for their resolution, including automated notification of affected customers or supplemental inquiries at external service providers and including a permanently current overview of the cost relevance of the respective development.

The method according to the invention can be used in particular when the MIS job data are transmitted to the prepress system in Portable Job Ticket Format, or in Job Definition Format, and when the prepress job data are created by the prepress system in Portable Job Ticket Format, in Job Definition Format or in Print Production Format. Said formats are used in the state of the art at interfaces between MIS prepress systems and between prepress systems and press systems.

In particular, according to a method according to the invention, the prepress job data can include a fold position, a dimension for the printing plate, a number of printers' imprints, a size or position of a printer's imprint. From said data, which are typically included in a job ticket, the information relevant for the automatic presetting of printing- and book binding machines can be determined in a particularly simple manner.

According to such method according to the invention, a folding sequence can be determined by the Management Information System, in particular based on the prepress job data from the prepress system. The folding sequence and the imposing scheme actually used are substantial parameters for presetting the execution systems.

DETAILED DESCRIPTION OF PREFERRED EMBODIMENTS

The invention is subsequently described with reference to an embodiment. In a graphic production shop, various prepress systems, plate setters, printing systems, folding- and cutting systems, collators, gang stitching machines and automated packaging system of respective different manufacturers, as execution systems, are linked by a central Management Information System (MIS). The MIS plans and costs the particular process steps for producing print products on the connected execution systems, coordinates the communication of the execution systems and controls and monitors the execution of the production.

A customer places a request at a graphic print shop through a web interface of the MIS for production of a continuously four-colored, 16-page print product in the format DIN A4 (21×29.7 cm) with a print-run of 50,000 units, completion within five days after job issue. The MIS selects the production on a print sheet in the format 63×88 cm with a 16-pager in cross fold, schedules the use of the executions systems in a preliminary manner, calculates the particular cost on each execution system, and generates a quote on this basis, which is transmitted to the customer via e-mail, after being confirmed by the operator of the MIS.

The customer confirms the job through a web link in the e-mail and is directly relayed to the web interface of the selected prepress system. Directly before, the MIS has set up the job in the prepress system by transmitting the job data in a JDF file to the prepress system according to the data confirmed by the customer.

The customer transmits the page information in the form of a PDF file through the web interface of the prepress system, wherein said page information comprises a page format of 20×29 cm, which differs from the parameters specified in the request and in the job. Furthermore, the PDF file also includes overruns on the eight inner pages, thus graphical elements, which run from a left page into a right page. In response to a warning report from the prepress system with respect to the nonconforming page format, the manager in charge checks back with the customer and confirms the smaller format in the prepress system, since the customer wants to distribute the print product as an insert in a larger magazine, which comes in DIN A4 format. Furthermore, due to the overruns, the manager sets up the production on two 8-pagers in parallel fold.

The prepress system exposes the printing plate with a print sheet format of 61×86 cm based on the revised job data, with two 8-pagers in parallel fold, generates the job ticket in JDF format and transmits it to MIS, which initially extracts the information included in the job ticket, and recalculates the production of the job ticket and its cost on this basis.

In the meantime, the operator of the MIS has, on the one hand, doubled the print-run of the print product after another call from the customer, and, on the other hand, he has reconfigured the packaging for airmail distribution according to the customer's instructions. The MIS compiles the data, which have been updated in several areas, and transmits the revised job ticket to production. In production, the data included in the job ticket can be directly used for automatic setup of the execution systems. The manual rework, which is not avoidable in the state of the art, is effectively avoided by the method according to the invention.

What is claimed is:

1. A method for controlling the production of a print product through a management information system, comprising:
   determining management information system job data in a management information system;
   transmitting the management information system job data to a prepress system from the management information system;
   generating prepress job data for at least one execution system in the context of the production of the print product in the prepress system by revising the management information system job data and determining prepress job data from the revised management information system job data;
   creating a print sheet layout for producing a printing plate on a plate setter from the prepress job data and creating a job ticket for subsequent execution systems;
   transmitting the prepress job data to the management information system from the prepress system; and
   controlling the production of the print product based on the prepress job data with the management information system,
   wherein the management information system job data includes at least one of imposing schemes, sheet formats, paper types, a selection of execution systems to be used for producing the print product, and the respective use dates and run times.

2. The method according to claim 1, further comprising:
   transmitting management information system job data in Portable Job Ticket Format or in Job Definition Format to the prepress system from the management information system; and
   transmitting the prepress job data in one of said formats or in Print Production Format to the management information system from the prepress system.

3. The method according to claim 1, wherein the management information system job data is used to automatically setup the at least one execution system.

4. The method according to claim 1, wherein the prepress job data include at least dimensions of a printing plate or number, size or positions of folding markers or cutting markers.

5. The method according to claim 4, wherein the management information system, based on the prepress job data, determines at least a print sheet format of the print product, a format or a fold sequence of a fold sheet, positions of cuts, or an end format of the print product and the respective parameters of at least one print press, one folding apparatus, one cutting apparatus or one gang stitching binder for producing the print product.

6. The method according to claim 1,
   wherein the management information system and the prepress system are networked; and
   wherein the management information system acts as a central controlling and monitoring unit.

7. The method according to claim 1, wherein the management information system performs automated processing and interpretation.

8. The method according to claim 1,
   wherein the management information system job data is used generating a quote for producing the print product according to a request by a customer, and
   wherein the management information system job data is used for controlling the at least one execution system after acceptance of the quote by the customer.

9. An apparatus for controlling the production of a print product, comprising:
   a management information system; and
   a prepress system;
   wherein the management information system determines management information system job data and transmits the management information system job data to the prepress system from the management information system;
   wherein the prepress system generates prepress job data for at least one execution system in the context of the production of the print product in the prepress system by revising the management information system job data and determining prepress job data from the revised management information system job data;
   wherein the prepress system creates a print sheet layout for producing a printing plate on a plate setter from the prepress job data and creates a job ticket for subsequent execution systems;
   wherein the prepress system creates transmits the prepress job data to the management information system; and
   wherein the management information system controls the production of the print product based on the prepress job data, and
   wherein the management information system job data includes at least one of imposing schemes, sheet formats, paper types, a selection of execution systems to be used for producing the print product, and the respective use dates and run times.

10. The apparatus according to claim 9, further comprising:
    the management information system transmits the management information system job data in Portable Job Ticket Format or in Job Definition Format to the prepress system from; and
    the prepress system transmits the prepress job data in one of said formats or in Print Production Format to the management information system.

11. The apparatus according to claim 9, wherein the management information system job data is used to automatically setup the at least one execution system.

12. The apparatus according to claim 9, wherein the prepress job data include at least dimensions of a printing plate or number, size or positions of folding markers or cutting markers.

13. The apparatus according to claim 12, wherein the management information system, based on the prepress job data, determines at least a print sheet format of the print product, a format or a fold sequence of a fold sheet, positions of cuts, or an end format of the print product and the respective parameters of at least one print press, one folding apparatus, one cutting apparatus or one gang stitching binder for producing the print product.

14. The apparatus according to claim 9,
wherein the management information system and the prepress system are networked; and
wherein the management information system acts as a central controlling and monitoring unit.

15. The apparatus according to claim 9, wherein the management information system performs automated processing and interpretation.

16. The apparatus according to claim 9,
wherein the management information system job data is used to generate a quote for producing the print product according to a request by a customer, and
wherein the management information system job data is used to control the at least one execution system after acceptance of the quote by the customer.

17. A computer program embodied on a non-transitory computer readable medium comprising:
computer code for determining management information system job data in a management information system;
computer code for transmitting the management information system job date to a prepress system from a the management information system;
computer code for generating progress job data for at least one execution system in the context of the production of the print product in the prepress system by revising the management information system job data and determining prepress job data from the revised management information system job data;
computer code for creating a print sheet layout for producing a printing plate on a plate setter from the prepress job data and creating a job ticket for subsequent execution systems;
computer code for transmitting the prepress job data to the management information system from the prepress system; and
computer code for controlling the production of the print product based on the prepress job data with the management information system,
wherein the management information system job data includes at least one of imposing schemes, sheet formats, paper types, a selection of execution systems to be used for producing the print product, and the respective use dates and run times.

18. The computer program embodied on a non-transitory computer readable medium according to claim 17, wherein the management information system job data is used to automatically setup the at least one execution system.

19. The computer program embodied on a non-transitory computer readable medium according to claim 17,
wherein the prepress job data include at least dimensions of a printing plate or number, size or positions of folding markers or cutting markers, and
wherein the management information system, based on the prepress job data, determines at least a print sheet format of the print product, a format or a fold sequence of a fold sheet, positions of cuts, or en end format of the print product and the respective parameters of at least one print press, one folding apparatus, one cutting apparatus or one gang stitching binder for producing the print product.

20. The computer program embodied on a non-transitory computer readable medium according to claim 17,
wherein the management information system job data is used generating a quote for producing the print product according to a request by a customer, and
wherein the management information system job data is used for controlling the at least one execution system after acceptance of the quote by the customer.

* * * * *

UNITED STATES PATENT AND TRADEMARK OFFICE
CERTIFICATE OF CORRECTION

PATENT NO. : 8,319,996 B2  Page 1 of 1
APPLICATION NO. : 12/304203
DATED : November 27, 2012
INVENTOR(S) : Thomas Reichhart It is certified that error appears in the above-identified patent and that said Letters Patent is hereby corrected as shown below:

In column 7, line 36, in Claim 17, delete "date" and insert -- data --, therefor.

In column 7, line 36, in Claim 17, after "from" delete "a".

In column 7, line 38, in Claim 17, delete "progress" and insert -- prepress --, therefor.

In column 8, line 28, in Claim 19, delete "en" and insert -- an --, therefor.

Signed and Sealed this
Nineteenth Day of March, 2013

Teresa Stanek Rea
*Acting Director of the United States Patent and Trademark Office*